United States Patent
Ozharar et al.

(10) Patent No.: US 11,619,542 B2
(45) Date of Patent: Apr. 4, 2023

(54) DISTRIBUTED ACOUSTIC SENSING BASED NATURAL FREQUENCY MEASUREMENT OF CIVIL INFRASTRUCTURES

(71) Applicant: NEC Laboratories America, Inc., Princeton, NJ (US)

(72) Inventors: Sarper Ozharar, Princeton, NJ (US); Yue Tian, Princeton, NJ (US); Yangmin Ding, North Brunswick, NJ (US); Ting Wang, West Windsor, NJ (US)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 17/228,675

(22) Filed: Apr. 12, 2021

(65) Prior Publication Data
US 2021/0318167 A1    Oct. 14, 2021

Related U.S. Application Data

(60) Provisional application No. 63/009,657, filed on Apr. 14, 2020.

(51) Int. Cl.
    *G01H 9/00*    (2006.01)
(52) U.S. Cl.
    CPC .................... *G01H 9/004* (2013.01)
(58) Field of Classification Search
    CPC ................. G01H 9/004; G01H 9/006
    See application file for complete search history.

(56) References Cited

U.S. PATENT DOCUMENTS

| 5,900,556 A * | 5/1999 | Ahmad .............. G01L 1/242 250/227.14 |
| 8,494,790 B2 * | 7/2013 | Zhu ................ G01N 29/227 702/56 |
| 10,330,594 B2 * | 6/2019 | Eyal ............ G01M 11/3127 |
| 10,436,024 B2 * | 10/2019 | Bakulin .............. G01V 1/46 |
| 11,060,950 B1 * | 7/2021 | Xia ............. G01M 11/3145 |
| 11,193,367 B2 * | 12/2021 | Jin .................. E21B 47/06 |
| 2005/0072234 A1 * | 4/2005 | Zhu ................ G01N 29/227 702/56 |
| 2008/0294354 A1 * | 11/2008 | Zhu .................... G01H 13/00 702/56 |
| 2013/0129275 A1 * | 5/2013 | Giurgiutiu ........ G01M 5/0066 385/12 |
| 2020/0064122 A1 * | 2/2020 | Nawrot ................ G01B 7/16 |
| 2020/0249076 A1 * | 8/2020 | Ip ..................... G01H 9/004 |
| 2020/0326261 A1 * | 10/2020 | Champavere ..... G01M 11/3136 |
| 2020/0370950 A1 * | 11/2020 | Ip ........................ G01B 11/18 |
| 2021/0278314 A1 * | 9/2021 | Xia ............... G01M 11/3145 |
| 2021/0318165 A1 * | 10/2021 | Ozharar .......... G01D 5/35361 |

(Continued)

FOREIGN PATENT DOCUMENTS

| WO | WO-2010020796 A1 * | 2/2010 | .......... F17D 5/06 |
| WO | WO-2018002582 A1 * | 1/2018 | .......... B61L 1/06 |

(Continued)

*Primary Examiner* — Thomas A Hollweg
*Assistant Examiner* — Mary A El-Shammaa
(74) *Attorney, Agent, or Firm* — Joseph Kolodka (57) ABSTRACT

Aspects of the present disclosure describe distributed fiber optic sensing (DFOS)—distributed acoustic sensing (DAS) based systems, methods, and structures that advantageously enable and/or facilitate the determination of natural frequency(ies) of civil infrastructures.

7 Claims, 6 Drawing Sheets

(56) References Cited

U.S. PATENT DOCUMENTS

2022/0065977 A1* 3/2022 Ozharar ................ G01S 3/8083
2022/0146304 A1* 5/2022 Hu ......................... G01H 9/004
2022/0163376 A1* 5/2022 Xia ........................ G01H 9/004

FOREIGN PATENT DOCUMENTS

WO    WO-2020097682 A1 * 5/2020 ......... G01D 5/35358
WO    WO-2022046949 A1 * 3/2022 ............. G01H 9/004

* cited by examiner

FIG. 1

Prior Art

DISTRIBUTED ACOUSTIC SENSING BASED NATURAL FREQUENCY MEASUREMENT OF CIVIL INFRASTRUCTURES

CROSS REFERENCE

This disclosure claims the benefit of U.S. Provisional Patent Application Ser. No. 63/009,657 filed 14 Apr. 2020 the entire contents of which is incorporated by reference as if set forth at length herein.

TECHNICAL FIELD

This disclosure relates generally to distributed fiber optic sensing (DFOS) systems, methods, and structures and more particularly to distributed acoustic sensing (DAS) for mapping civil infrastructures.

BACKGROUND

As is known, the ability to monitor and map civil infrastructures including buildings and bridges—among others—is of critical contemporary importance since the condition(s) of such infrastructures has fallen into a certain state of disrepair. Accordingly, systems, methods, and structures the facilitate the determination and extent of any non-uniformities that exist or are developing in such infrastructures would represent a welcome addition to the art.

SUMMARY

An advance in the art is made according to aspects of the present disclosure directed to distributed fiber optic sensing (DFOS)—distributed acoustic sensing (DAS) systems, methods, and structures that advantageously enable and/or facilitate continuous, real-time determination of natural frequency(ies) of civil infrastructures that may advantageously provide information about the infrastructures' physical condition.

In sharp contrast to the prior art, since "normal" vibrations/frequency(ies) associated with infrastructures are very weak, and therefore difficult to measure even with sensitive systems and methods, systems, methods, and structures according to aspects of the present disclosure enhance mechanical vibrations of these structures by employing a low frequency shaker/transducer as part of the overall DAS system.

Using our new configurations and methods disclosed herein, natural frequencies of structures can be measured quickly and at low cost—especially for multiple structures having fiber optic cables already installed/attached/mounted thereto.

Finally—in further contrast to the art—systems, methods, and structures according to aspects of the present disclosure provide a direct measurement of natural frequencies of a structure without requiring post-processing or algorithmic analysis requiring undesirable assumptions.

BRIEF DESCRIPTION OF THE DRAWING

A more complete understanding of the present disclosure may be realized by reference to the accompanying drawing in which.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGS. comprising the drawing are not drawn to scale.

Figure 1:
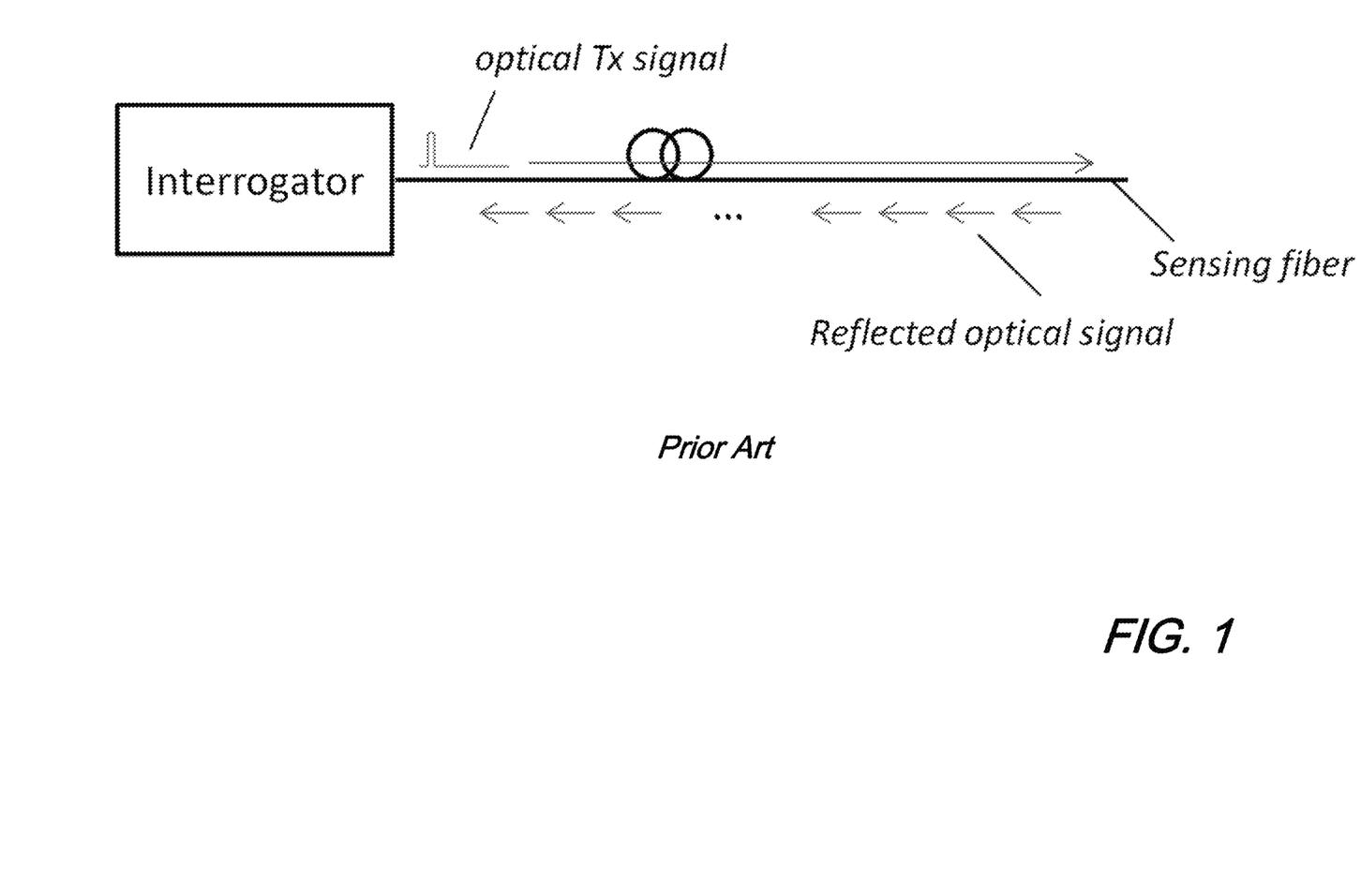
FIG. 1 is a schematic diagram of an illustrative distributed fiber optic sensing system and operation generally known in the art.

By way of some additional background—and with reference to FIG. 1 which is a schematic diagram of an illustrative distributed fiber optic sensing system generally known in the art—we begin by noting that distributed fiber optic sensing (DFOS) is an important and widely used technology to detect environmental conditions (such as temperature, vibration, stretch level etc.) anywhere along an optical fiber cable that in turn is connected to an interrogator. As is known, contemporary interrogators are systems that generate an input signal to the fiber and detects/analyzes the reflected/scattered and subsequently received signal(s). The signals are analyzed, and an output is generated which is indicative of the environmental conditions encountered along the length of the fiber. The signal(s) so received may result from reflections in the fiber, such as Raman backscattering, Rayleigh backscattering, and Brillion backscattering. It can also be a signal of forward direction that uses the speed difference of multiple modes. Without losing generality, the following description assumes reflected signal though the same approaches can be applied to forwarded signal as well.

As will be appreciated, a contemporary DFOS system includes an interrogator that periodically generates optical pulses (or any coded signal) and injects them into an optical fiber. The injected optical pulse signal is conveyed along the optical fiber.

At locations along the length of the fiber, a small portion of signal is reflected and conveyed back to the interrogator. The reflected signal carries information the interrogator uses to detect, such as a power level change that indicates—for example—a mechanical vibration.

The reflected signal is converted to electrical domain and processed inside the interrogator. Based on the pulse injection time and the time signal is detected, the interrogator determines at which location along the fiber the signal is coming from, thus able to sense the activity of each location along the fiber.

As we shall show and describe—systems, methods, and structures according to aspects of the present disclosure employs a DAS (Distributed Acoustic Sensor) interrogator to recover a vibration occurring anywhere along a sensing fiber in equivalent sampling frequency of the pulse repetition rate. For example, for a DAS that uses pulses of 20 kHz repetition rate, the vibration at the point of interest will be sampled at 20 kHz frequency which—as those skilled in the art will understand and appreciate—is able to cover frequency of up to 10 kHz according to Nyquist rule.

By employing DAS principles to infrastructures, we note that a propagation speed of an acoustic wave along a structure depends on structural parameters such as bulk modulus, shear modulus and density. If one or more of these parameters are non-uniform over a structure, or change over time, so will the acoustic wave-speed.

According to aspects of the present disclosure then—measuring an acoustic wave-speed in a structure together with its spatial distribution on that structure and monitoring it (the acoustic wave-speed) over a period of time, we can advantageously and surprisingly track any changes and/or non-uniformities that have occurred or are occurring in a structure.

We note again—and as will be readily appreciated by those skilled in the art—that the natural frequencies of a structure (such as a bridge, a building or a utility pole) and changed of these natural frequencies over a period of time are important parameters for identifying/categorizing and tracking the structural health status of the structure.

Current methods to measure the natural frequencies of a structure generally involves multiple accelerometer sensors placed at different points on the structure—measuring their response to an impact hammer and/or ambient excitations, and analyzing the data using some algorithms such as FDD (frequency domain decomposition), or SSI (subspace identification). Since these methods involve multiple sensors, as the number of structures (not necessarily the size) increases, the method is time consuming and costly.

As we shall show and describe systems, methods, and structures according to aspects of the present disclosure provides a DAS (distributed acoustic sensing) system the ability to measure natural frequencies of a structure simply and quickly.

Generally, such systems, methods, and structures according to the present disclosure include three units, working in combination with one another namely, Unit 1: Low Frequency Acoustic Signal Source and Shaker;
Unit 2: Fiber Cable (already installed on the structure, or to be installed); and
Unit 3: Distributed Acoustic Sensing System Operationally, the low frequency acoustic shaker is mounted on the structure and starts vibrating at a varying frequency. As the frequency of the shaker approaches one of the structure's natural frequencies, the structure's vibration also increases and becomes a maximum once the vibration frequency of the shaker is substantially equals to the structure's natural frequency. Since changes in frequency of the shaker over time is known, the natural frequency of the structure can be determined from the time when the structure's vibration reaches a maximum.

The resulting vibration amplitude as a function of time/frequency is measured and recorded by a DAS system which employs a fiber optical cable suspended or otherwise mounted to the structure as a sensing medium. As we shall show, systems, methods, and structures according to aspects of the present disclosure are extremely cost effective and advantageous when applied to structures having fiber optic cables already attached thereto—such as utility poles, bridges, and buildings.

And as will be especially appreciated by those skilled in the art, systems, methods, and structures according to aspects of the present disclosure may operate the DAS sensing over optical fiber cable that simultaneously carries communications or other services data known in contemporary society.

Those skilled in the art will appreciate further that the DAS system, owing to being a highly sensitive method to detect very small/minor vibrations, can be used to detect external vibration sources (i.e. traffic, sound, intrusion etc.). Additionally, it can also measure any vibrations of the structure to which the fiber is mounted (such as a utility pole, a bridge, or a building, or any infrastructure element).

Finally, we note that such "normal" vibrations associated with infrastructure are very weak, and as such are difficult to measure even with sensitive systems and methods. As we noted and as we will describe, our systems, methods, and structures according to aspects of the present disclosure enhance mechanical vibrations of these structures by employing a low frequency shaker/transducer as part of the overall DAS system.

Using this novel configuration, natural frequencies of structures can be measured quickly and at low cost (especially for the multiple structures with already installed fiber cables).

We note further that our systems, methods, and structures according to aspects of the present disclosure provide a direct measurement of natural frequencies of a structure without requiring any post-processing or an algorithmic analysis that may require numerous assumptions in operation.

Figure 2:
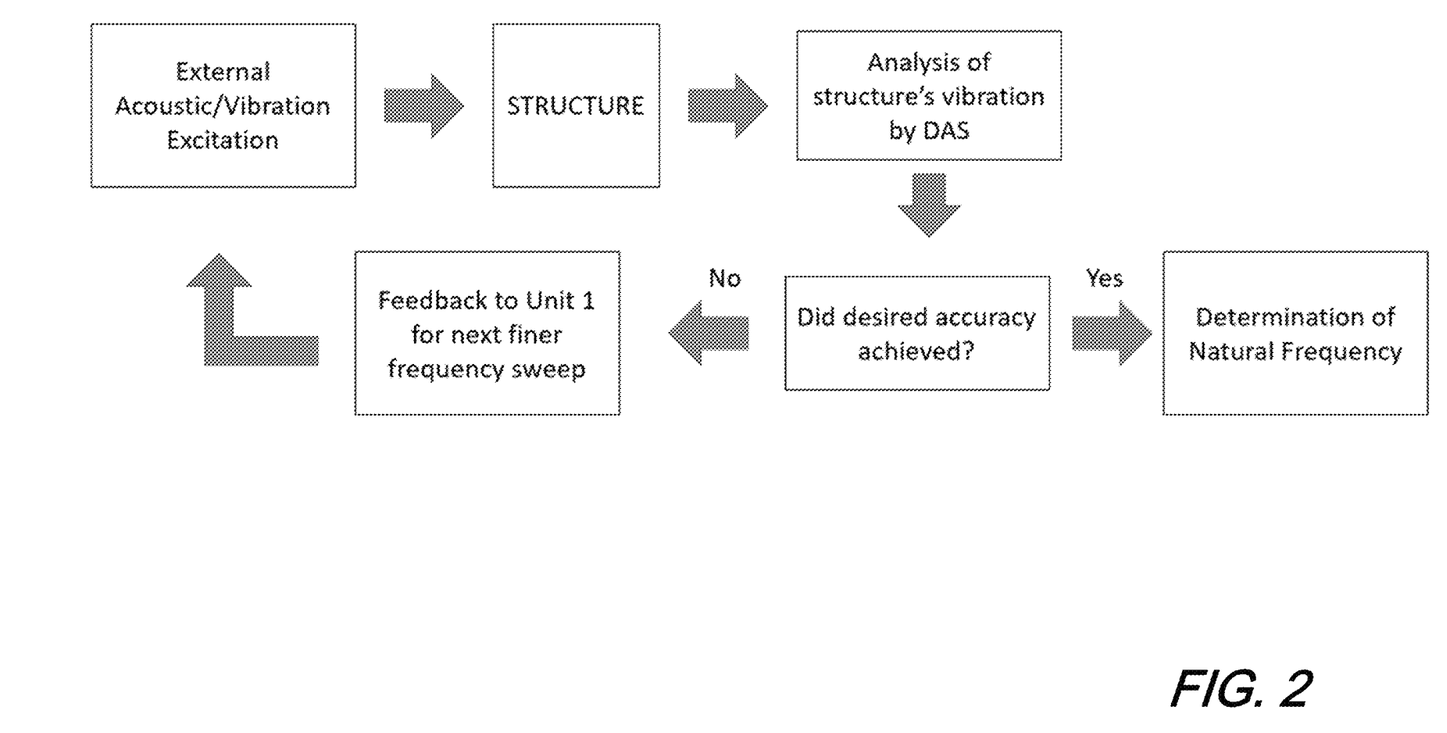
FIG. 2 is a diagram illustrating an overall operational flow of DAS monitoring of infrastructures according to aspects of the present disclosure.

FIG. 2 is a diagram illustrating an overall operational flow of DAS monitoring of infrastructures according to aspects of the present disclosure. With reference to that figure our method(s) according to aspects of the present disclosure begin by inducing an external sweeping vibration to the structure by a low frequency acoustic signal source and shaker (Unit 1) attached to an infrastructure structure which also has attached thereto a length of optical fiber cable which serves as a sensing medium for a DAS system including interrogator. This vibration induces strains in the fiber cable and is detected and recorded by the DAS system. After processing temporal vibration data of the structure, a natural frequency over a sweeping range is determined. If higher accuracy is desired/required, another frequency sweep over a narrower range is performed as many times as desired. Such frequency sweeps can be repeated until a desired accuracy is achieved.

Figure 3:
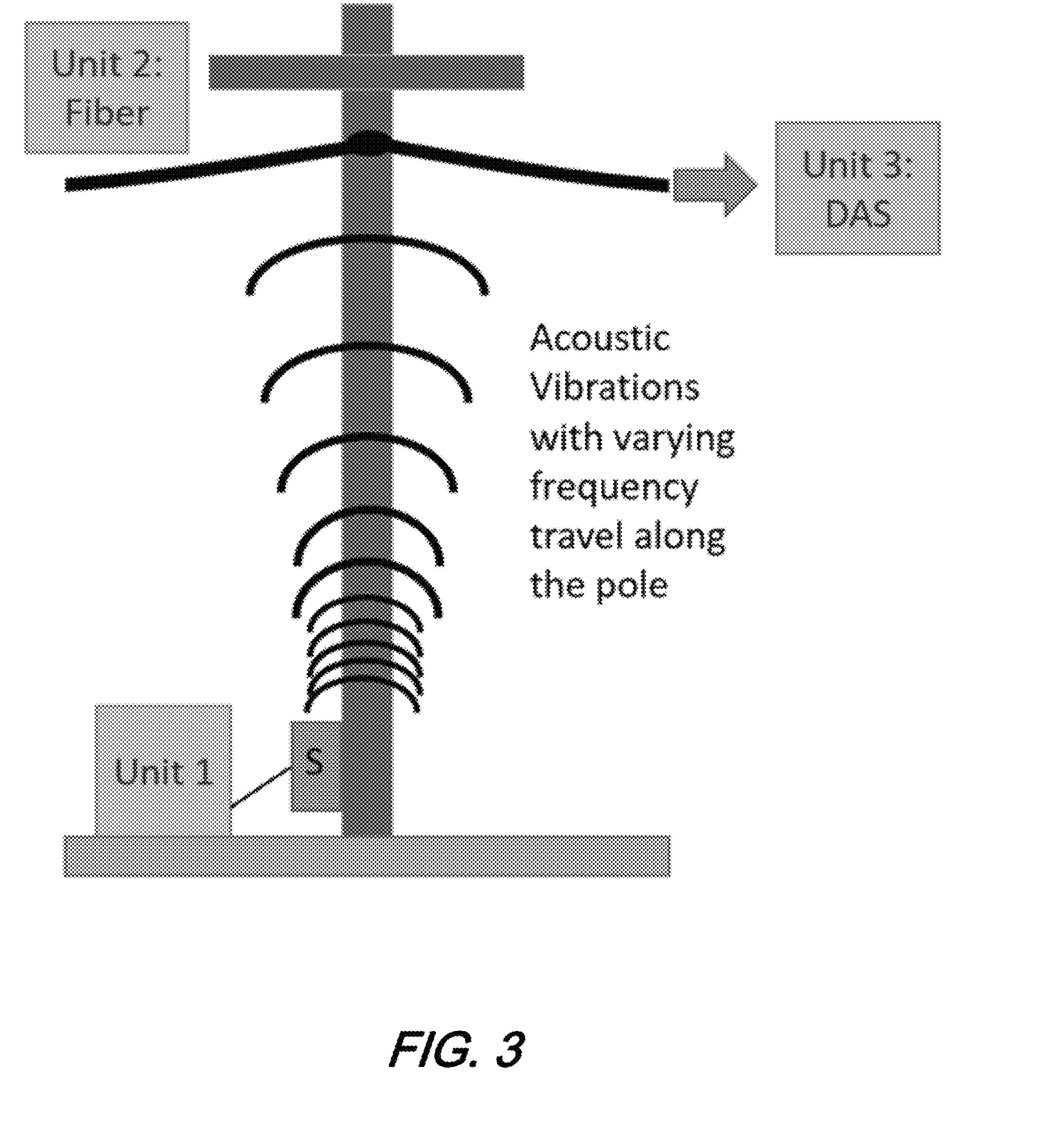
FIG. 3 is a schematic diagram illustrating operating principles for the monitoring of infrastructures as applied to a utility pole according to aspects of the present disclosure.

FIG. 3 is a schematic diagram illustrating operating principles for the monitoring of infrastructures as applied to a utility pole according to aspects of the present disclosure.

As may be observed from that figure, infrastructure monitoring may be recognized to include three main units working together, namely:

Unit 1: An acoustic signal generator incorporated with a shaker/transducer that may be temporarily mounted on a structure to be analyzed.

Unit 2: A fiber optic cable mounted on the structure (permanently and preferably already installed to reduce cost).

Unit 3: A DAS system including interrogator preferably located at a central office, to measure vibrations of the structure through the use of fiber optic cable as a sensor.

Operationally, the transducer/shaker of Unit 1 is mounted on the structure (such as a pole or a bridge) at a convenient location.

The transducer/shaker is driven by an acoustic sine wave whose acoustic frequency is swept from f min up to f max over a time duration of tsweep generated by Unit 1. Note that exemplary values may be—for example: f min=5 Hz, f max=50 Hz, tsweep=60 seconds.

As the shaker is vibrating at a varying frequency (linearly or in steps), the structure to which it is attached also vibrates which in turn results in a vibration of the fiber mounted on the structure.

These vibrations of the fiber are measured as a function of time by the DAS unit located at the central office.

Figure 4:
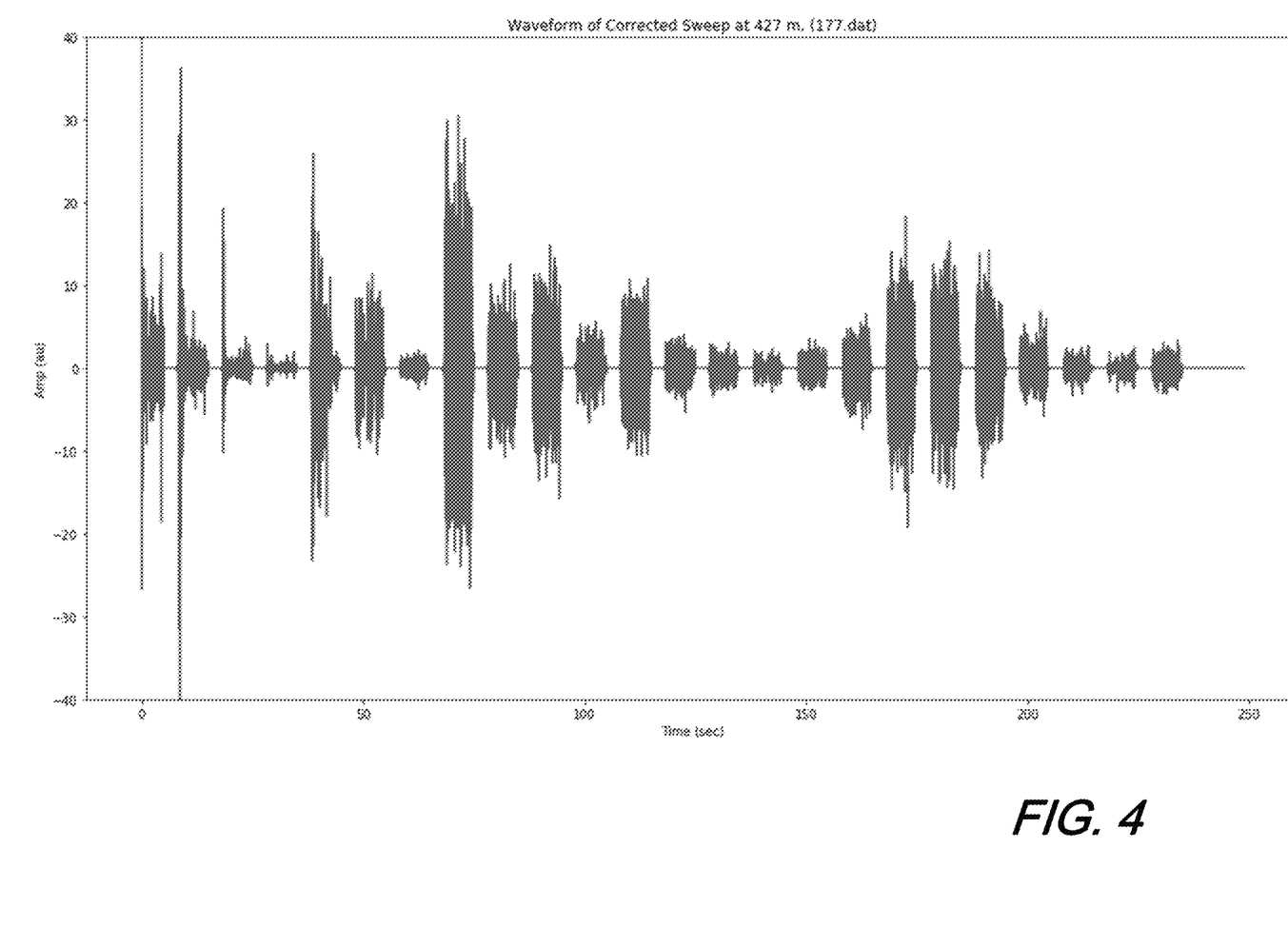
FIG. 4 is a plot illustrating an illustrative step-sweep data of a utility pole according to aspects of the present disclosure.

FIG. 4 is a plot illustrating an illustrative step-sweep data as a function of time of a utility pole according to aspects of the present disclosure.

As may be observed from this FIG. 4. plot, the eighth segment exhibits the maximum vibrational amplitude. Even though all segments have the same shaking amplitude, the pole vibrates most at that certain frequency, which by definition gives one of the structures natural frequencies.

In order to obtain a result with higher accuracy, one can do multiple frequency sweeps each with a finer frequency sweep (in a narrower frequency range) around the measured natural frequency. For example, if the natural frequency is found to be around 12 Hz after the first sweep from 5 Hz to 100 Hz in 60 seconds, one can do a second sweep from 10 Hz to 13 Hz in 60 seconds, and this time the natural frequency can be found as 12.4 Hz. Then one can do a third sweep between 12 Hz and 13 Hz in 60 seconds and this time the natural frequency can be found as 12.36 Hz.

At this point we note that the shaker/transducer is preferably driven by a normalized sweep function. In other words, for every frequency the amplitude of the shaker should be the same.

Additionally, the lowest natural frequency that can be measured will be limited by the lowest frequency of the shaker. This may be avoided by using multiple shakers operating with different frequencies such as f1 and f2, and the pole will vibrate at the following frequencies f1, f2, f1+f2, and f1−f2. By choosing f1 and f2 values properly, systems, methods, and structures according to aspects of the present disclosure can advantageously achieve even sub-Hertz vibrations.

Finally, and as we have noted previously, to obtain a higher accuracy result, it is possible to do multiple sweeps, however this operation preferably requires a synchronization and feedback between Unit 3: DAS and the Unit 1: Acoustic Source.

Figure 5:
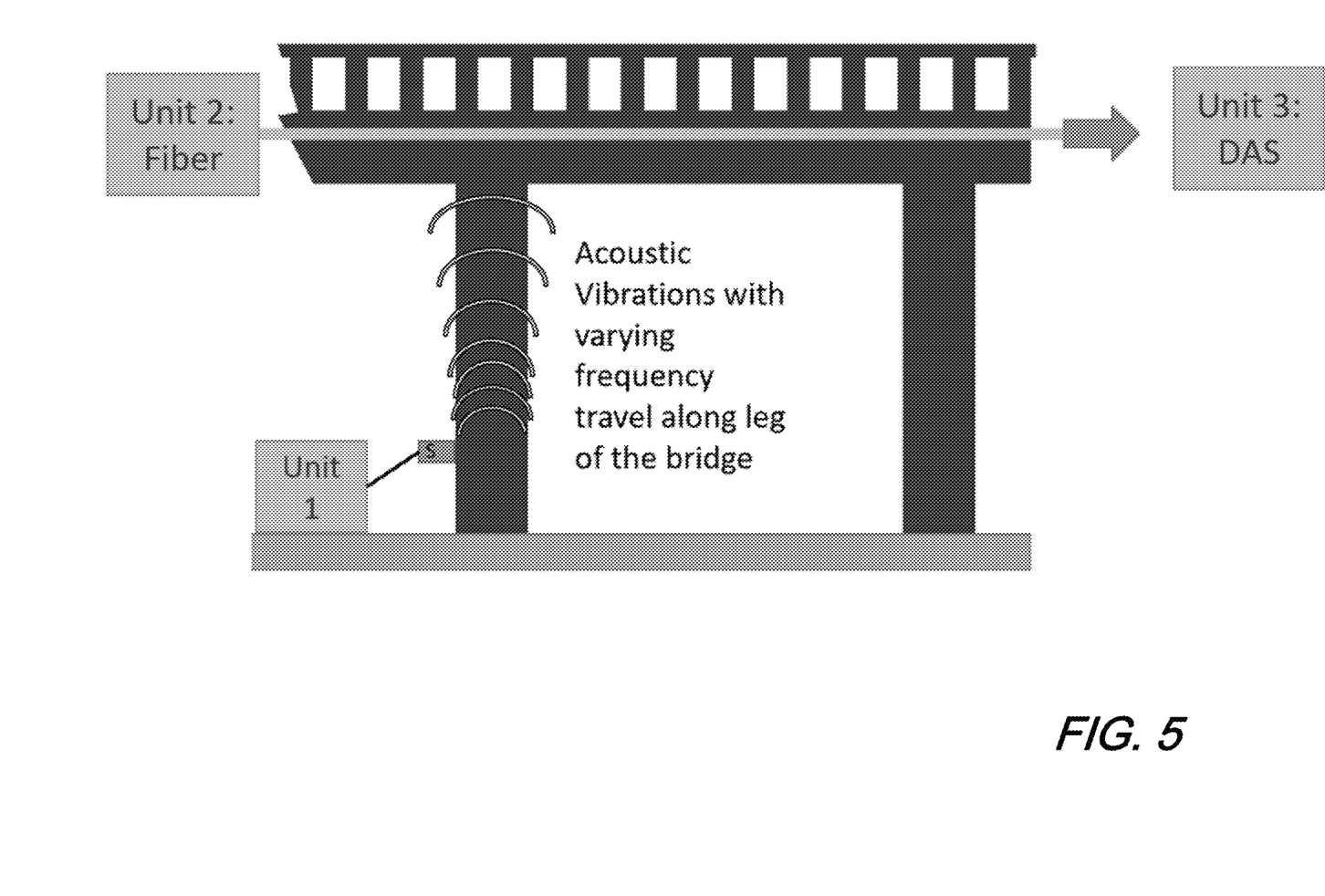
FIG. 5 is a schematic diagram illustrating operating principles for the monitoring of infrastructures as applied to a bridge according to aspects of the present disclosure.

FIG. 5 is a schematic diagram illustrating operating principles for the monitoring of infrastructures as applied to a bridge according to aspects of the present disclosure. Those skilled in the art will appreciate that systems, methods, and structures according to aspects of the present disclosure can be applied to determine the natural frequency(ies) of any infrastructure to which an optical fiber and shaker may be mounted/affixed.

As will be further appreciated by those skilled in the art, by continuously monitoring the natural frequency, or periodically monitoring the natural frequency of an infrastructure structure, informed determinations may be made about the "health" of that infrastructure and possible decay/damage that the structure is/has experienced.

Figure 6:
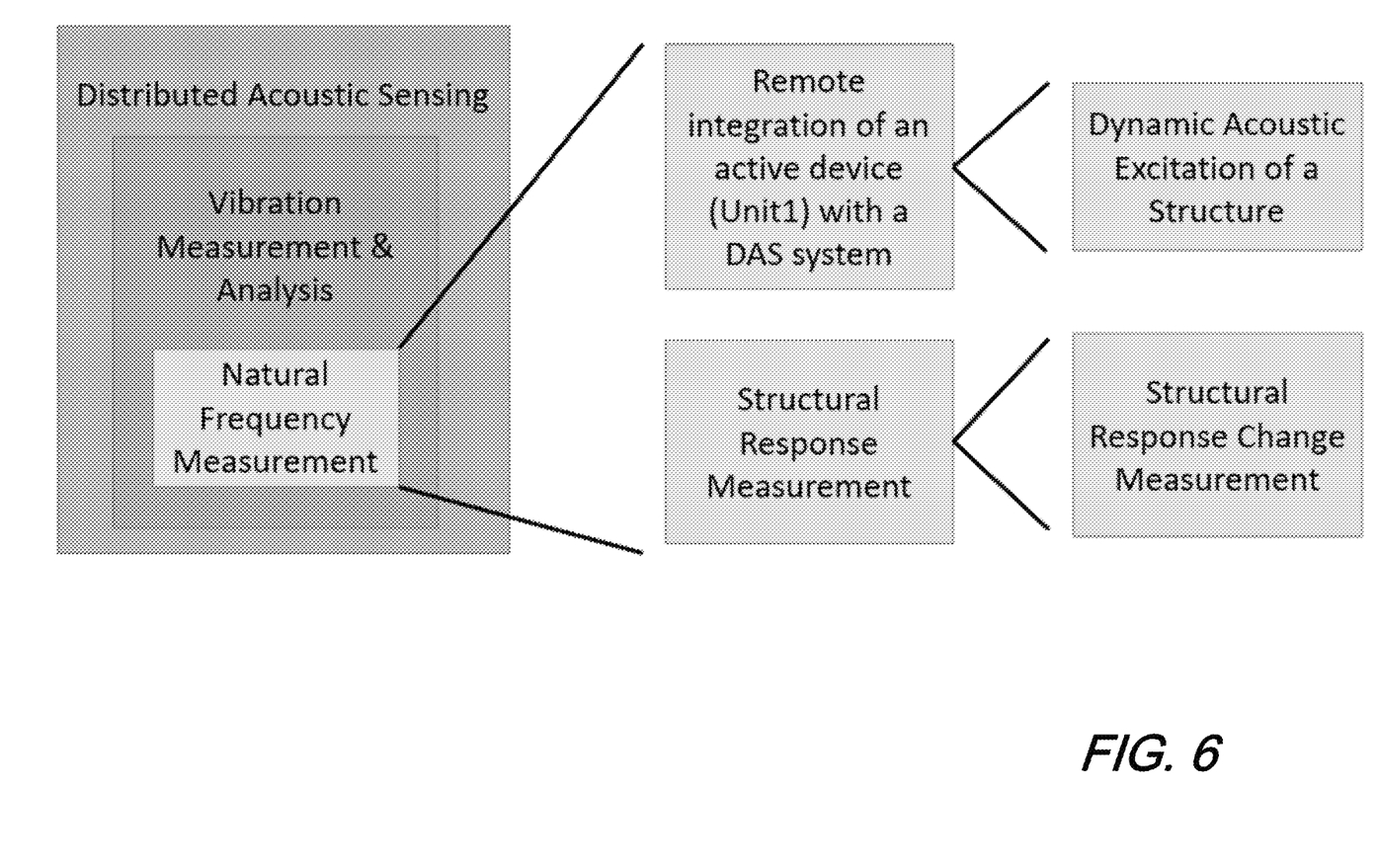
FIG. 6 is a schematic block diagram illustrating certain features for systems methods and structures for the monitoring of infrastructures according to aspects of the present disclosure.

FIG. 6 is a schematic block diagram illustrating certain features for systems methods and structures for the monitoring of infrastructures according to aspects of the present disclosure. Of particular interest, and as broadly illustrated in the figure, systems, methods, and structures according to aspects of the present disclosure utilize an external acoustic/vibration source with a DAS system determine a natural frequency(ies) of an infrastructure/structure. Such source provides dynamic excitation to the structure and scans over a frequency range while a DAS system measures the structure's response as a function of frequency and determines the structure's natural frequency.

At this point, while we have presented this disclosure using some specific examples, those skilled in the art will recognize that our teachings are not so limited. Accordingly, this disclosure should only be limited by the scope of the claims attached hereto.

The invention claimed is:

1. A method of monitoring civil infrastructure using distributed fiber optic sensing (DFOS)/distributed acoustic sensing (DAS), the method comprising:
    providing a length of optical fiber, at least a portion of which is positioned in physical contact with the civil infrastructure; and
    providing a distributed optical fiber sensing—distributed acoustic sensing interrogator in optical communication with the length of optical fiber;
    providing a plurality of external acoustic transducer/vibration sources, each positioned on the infrastructure and operating each individual one of the plurality of external acoustic transducer/vibration sources over a vibrational range of frequencies such that vibrations are generated in the infrastructure;
    operating the DFOS-DAS to detect/determine vibration(s) induced into the optical fiber by the vibrating infrastructure; and
    determining, from the detected vibration(s), a natural vibrational frequency of the infrastructure;
    wherein each individual one of the plurality of external acoustic transducer/vibration sources are operated at different frequencies from one another.

2. The method of claim 1 wherein each individual one of the plurality of external acoustic transducer/vibration sources is driven by a substantially sinusoidal signal wave.

3. The method of claim 1 wherein each individual one of the plurality of external acoustic transducer/vibration sources is driven by a normalized sweep function such that for every frequency an amplitude is the same.

4. The method of claim 2 wherein each individual one of the plurality of external acoustic transducer/vibration sources produces acoustic vibrational frequencies from f min up to f max in a time duration of tsweep.

5. The method of claim 1 wherein the plurality of external acoustic transducer/vibration sources consist of two external acoustic transducer/vibration sources, ($vs_1$, $vs_2$), operated at different frequencies from one another ($f_1$, $f_2$), produce vibrations in the infrastructure including $f_1$, $f_2$, $f_1+f_2$, and $f_1-f_2$.

6. The method of claim 5 wherein $f_1$, $f_2$ are chosen to produce sub-Hertz vibrations in the infrastructure.

7. The method of claim 6 further comprising performing multiple frequency sweeps each with a finer frequency sweep in a narrower frequency range around the determined natural frequency.

\* \* \* \* \*